Feb. 17, 1948.  A. H. BENNETT  2,435,952
MICROSCOPE AND COUNTING CHAMBER THEREFOR
Filed June 16, 1943  2 Sheets-Sheet 1

INVENTOR.
ALVA H. BENNETT
BY Raymond A. Paquin
ATTORNEY

Feb. 17, 1948.  A. H. BENNETT  2,435,952
MICROSCOPE AND COUNTING CHAMBER THEREFOR
Filed June 16, 1943  2 Sheets-Sheet 2

INVENTOR.
ALVA H. BENNETT
BY Raymond A. Paquin
ATTORNEY

Patented Feb. 17, 1948

2,435,952

UNITED STATES PATENT OFFICE 2,435,952

MICROSCOPE AND COUNTING CHAMBER THEREFOR

Alva H. Bennett, Kenmore, N. Y., assignor, by mesne assignments, to American Optical Company, Southbridge, Mass., a voluntary association Application June 16, 1943, Serial No. 491,031

6 Claims. (Cl. 88—40)

This invention relates to optical counting devices for use with microscopes.

An object of the invention is to provide an optical counting device having reference lines thereon forming subdivided areas and which lines are distinguishable from the areas when viewed through the microscope and which subdivided areas may be varied in intensity to provide the desired contrast with the objects to be counted thereon without varying the intensity of the reference lines.

Another object of the invention is to provide a microscope and counting chamber with means for varying the background of the counting chamber to obtain better contrast with the objects placed on the counting chamber.

Another object of the invention is to provide an optical counting device for use with the microscope which counting device comprises subdivided areas having light polarizing means and light polarizing means in optical alignment with said counting chamber for varying the density of said divided areas.

Another object of the invention is to provide an optical counting device having areas subdivided by distinguishable lines with said areas having light modifying means and light modifying means in optical alignment with said counting device and which in combination with the light modifying means of the subdivided areas vary the contrast between the subdivided areas and objects placed thereon for counting.

Other objects and advantages of the invention will be apparent from the following description taken in connection with the accompanying drawings. It will be understood that many changes may be made in the details of construction and arrangement of parts without departing from the spirit of the invention as expressed in the accompanying claims. I, therefore, do not wish to be limited to the exact details of construction and arrangement of parts shown and described as the preferred form has been shown by way of illustration only.

Referring to the drawings.

Figure 1:
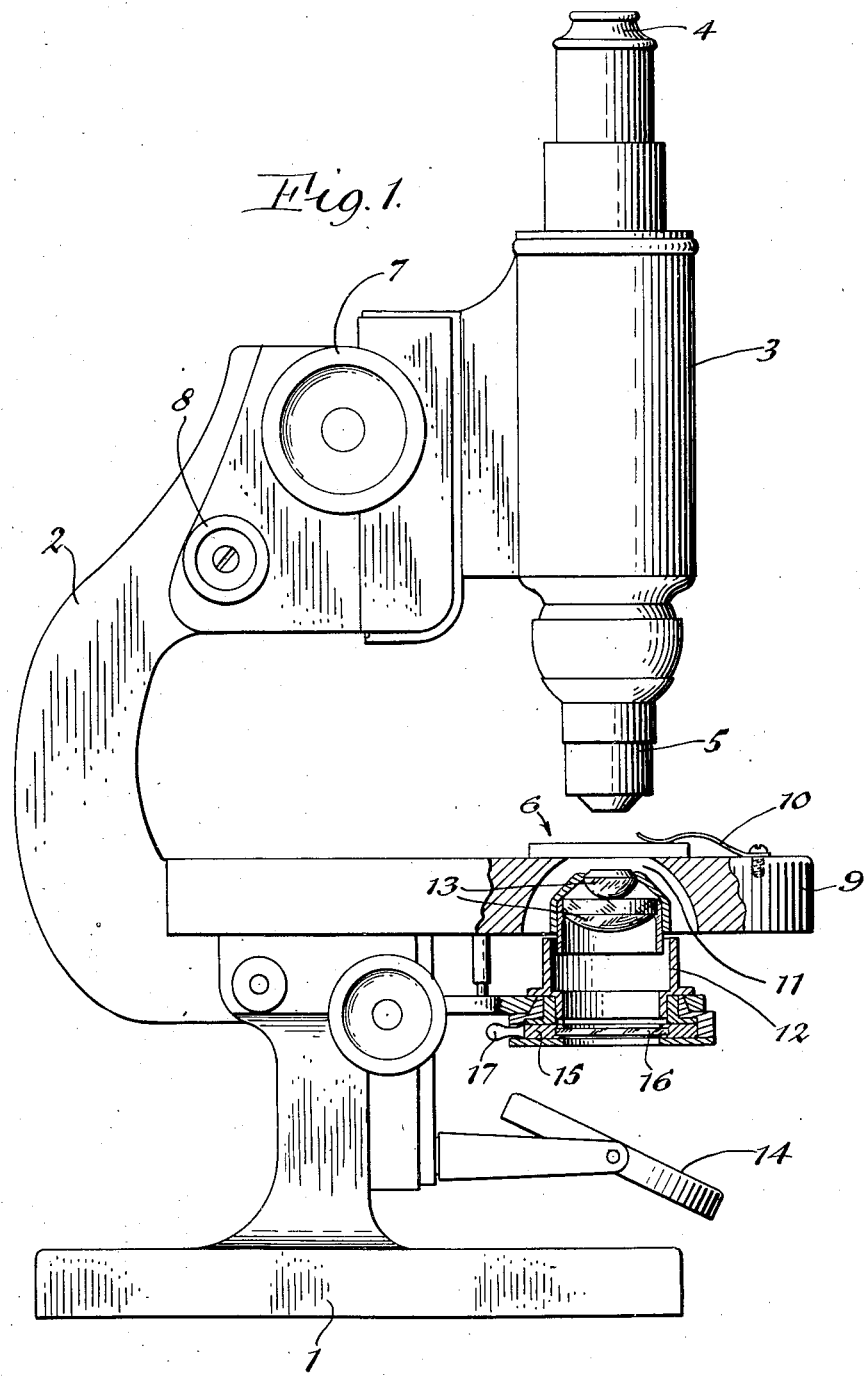
Fig. 1 is a side view, partly in section, of a microscope arrangement embodying the invention.
Figure 2:
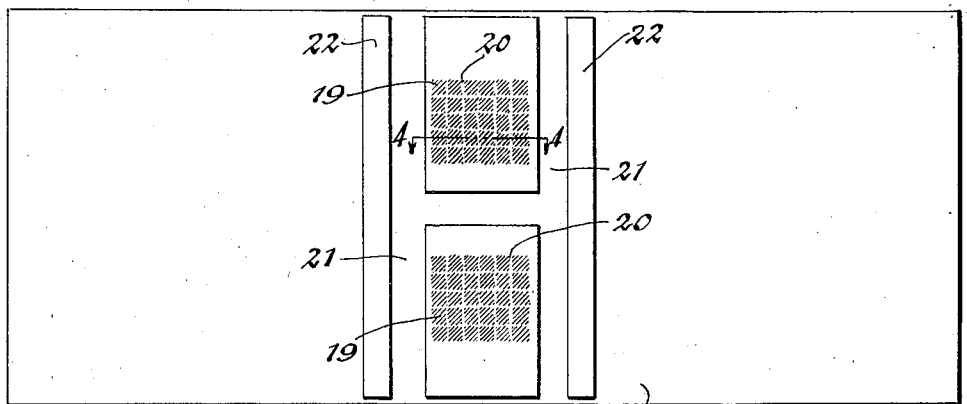
Fig. 2 is a top or plan view of a counting device constructed in accordance with this invention.
Figure 3:
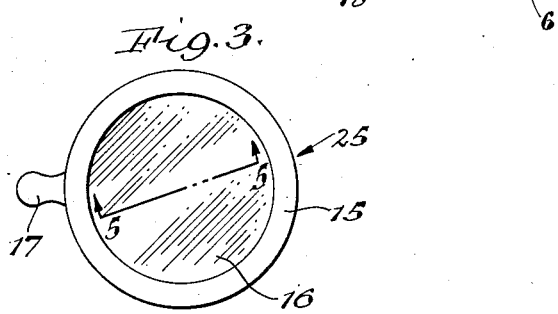
Fig. 3 is a top or plan view of the light modifying means constructed in accordance with this invention.
Figure 4:
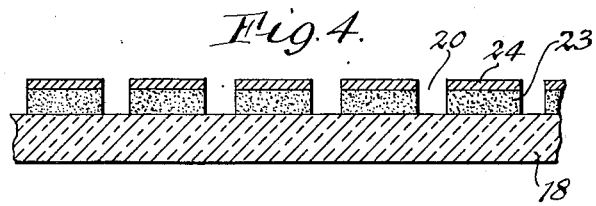
Fig. 4 is a sectional view on an enlarged scale taken on line 4—4 of Fig. 2.
Figure 5:
Fig. 5 is a sectional view on an enlarged scale taken on line 5—5 of Fig. 3.

In the construction of optical counting devices it is desirable that such devices be composed of subdivided or separate areas which are bounded by clearly distinguishable zones or lines in order to facilitate the counting of minute objects within said subdivided areas. Such devices and particularly those known as haemacytometers and stage micrometers or the like are viewed through a microscope or the like and in view of the fact that the objects which are viewed and counted are frequently difficult to distinguish; it is desirable that the subdivided areas be so constructed as to provide as great a contrast with the objects thereon as possible to facilitate the counting of such objects and also that some means be provided whereby the contrast between said separate or subdivided areas and the objects thereon may be varied to obtain the greatest possible contrast. Furthermore it is also necessary that such subdivided areas be so constructed as to allow sufficient illumination to pass therethrough to allow the counting of objects thereon.

The present construction is believed to accomplish all of these objects and advantages.

Referring more particularly to the drawings wherein similar reference characters designate corresponding parts throughout the several views, the arrangement is shown applied to a microscope which comprises the base 1 and upright arm 2 which carries the microscope body tube 3 which contains the eyepiece 4 and objective 5. The body tube 3 is adapted to be adjusted vertically to adjust the eyepiece 4 and objective 5 relative to the slide or counting device 6 by means of the coarse adjusting knob 7 and fine adjusting knob 8. The slide or counting device 6 is placed on the microscope stage 9 and retained in aligned relation with the objective 5 by means of the spring clip 10. The stage 9 is provided with an opening 11 in alignment with the objective 5 and over which is placed the counting chamber 6. Beneath the stage is provided the condenser arrangement 12 containing the condenser lens elements 13 adapted to focus light from a light source which light impinges upon the adjustable reflector 14 on to the counting chamber 6.

In the condenser arrangement 12 is provided the rotatable disc 15 adapted to contain the light modifying element 16 and having the handle 17 for rotation thereof as hereinafter described.

The counting chamber 6 is provided with a base portion 18 and contains the subdivided areas 19 which are subdivided or formed by the lines 20 and surrounding these areas are the moats or the like 21 and the supports 22 for supporting the cover glass over the ruled areas 19.

The ruled areas may be formed by forming a glass blank or support 18 and then securing over a portion of the surface of said blank 18 a layer 23 of a light polarizing film, which film is composed of a plastic base member containing large quantities of minute crystals which have their axes oriented and which film may be made by various known processes such as that described in Patent Nos. 1,918,848 and 1,956,867, and over the upper surface of the light polarizing film 23 may be placed a thin coating 24 of a low melting point glass or a glaze or which might be of a sputtered or evaporated metal such as described in patent to Ott, No. 1,994,483 and then the lines 20 are ruled through the layers 24 and 23 to form clearly distinguishable subdivided boundaries for the areas which are adapted to carry the objects to be counted. This layer 24 may also be formed of evaporated material such as quartz, magnesium fluoride, or other similar material evaporated in a vacuum.

In practice the material carrying the objects to be counted such as blood where it is desired to count the corpuscles may be treated in the usual manner and then small quantities placed on each of the ruled areas and a cover glass placed thereover resting on the upper surface of the supports 22 which extend a slight distance above the upper surface of the layer 24 to allow a layer of the material containing the objects to be counted, of controlled thicknesses, to remain between the cover glass and the upper surface of the layer 24 and the remainder is forced into the moats 21, etc.

In order to provide means for varying the contrast or degree of clearness with which the objects to be counted may be viewed there is provided beneath the counting chamber 6 and in optical alignment therewith the light polarizing disc 25 previously referred to as the light modifying element 16 and which may comprise the glass discs 26 having a film of polarizing material therebetween and this disc may be mounted in a retaining ring 15 and rotatably supported in the condenser member 12 wherein it may be rotated by means of the handle 17 to vary the position of the axis of said disc.

It will be noted that due to the light polarizing properties of the layer 23 and the disc 25 that the density of the illumination passing through the ruled areas of the chamber 6 may be easily and quickly varied by rotating or pivoting the light polarizing plate 25 relative to the ruled areas 19 to vary the relative positions of the optical axes of the light polarizing members.

It is also pointed out that by forming the glass layers 26 of desired color that the light passing therethrough may be filtered as desired.

It is also pointed out that instead of forming the plate 25 of a polarizing film 27 as described between the layers of glass 26 that the light polarizing crystals may be imbedded directly in a glass layer, such as taught by Patent No. 2,387,308, or formed by other suitable process.

It is also pointed out that instead of forming the counting chamber 6 as previously described this chamber may also be formed by imbedding the crystals directly in the glass or plastic base 18 in which case the layer 23 would be unnecessary and then the rulings 20 may be formed directly upon the upper surface of the plate 18 or in the layer of metal or the like which may be placed upon such surface and the lines 20 ruled through said metallic layer.

From the foregoing it will be seen that I have provided simple, efficient and economical means for obtaining all of the objects and advantages of the invention.

Having described my invention, I claim:

1. An optical counting device for use with a microscope or the like comprising a transparent body portion, said body portion having an area for supporting the specimen to be counted or under examination and spaced upstanding cover supporting means adjacent thereto, said area having a light polarizing layer of uniform thickness thereon, a second layer of transparent material overlying said first layer and serving as a protective coating for the first layer, division lines crossing said area for subdividing said layers into counting zones, said division lines being formed by the effective removal of portions of said light polarizing and protective layers, and a light polarizing member in optical alignment with said zones whereby when said area is observed through a microscope the division lines will be distinctly visible and distinguishable, one of said light polarizing members being pivotally adjustable relative to the other of said polarizing members to allow the light intensity of the background to be varied to the intensity best suited for the particular specimen.

2. An optical counting device for use with a microscope or the like having a light polarizing member in optical alignment with the light path thereof, said device comprising a light transmitting body portion, said body portion having spaced cover plate supporting ribs and a specimen supporting area therebetween, and a layer of material of uniform thickness upon said area and containing light polarizing means, clearly visible and distinguishable lines crossing said area and subdividing the layer into a plurality of counting zones each having uniform light transmitting properties, said lines being formed by the provision of unoccupied spaces between the adjacent counting zones, said light polarizing member being in said light path in alignment with said zones and being rotatably adjustable for varying the intensity of the light passing through said zones to suit the specimen under observation without materially altering the visibility of said lines.

3. A counting chamber for use in microscopes or the like having a light polarizing member in optical alignment with the light path thereof, said chamber being adapted to support a specimen or objects thereon and allow same to be examined or counted against a background of desired light intensity, said chamber comprising a base of transparent material having a light polarizing layer upon a portion thereof, division lines crossing the light polarizing layer and extending substantially therethrough to subdivide the layer into unit polarizing areas separated by substantially non-polarizing spaces therebetween, whereby when said layer is under magnification in said microscope and said lines are illuminated so as to be distinctly visible and distinguishable from said unit areas the angularity between said light polarizing member and said polarizing layer may be varied to vary the light intensity of the background as desired without materially altering the illumination of said division lines.

4. An optical counting chamber for use with a microscope or the like having a light polarizing member in optical alignment with the light path thereof and pivotally adjustable relative thereto, said chamber comprising a transparent body portion, said body portion having an area for supporting the specimen under test or examination and spaced upstanding cover supporting ribs adjacent thereto and arranged to support a flat transparent cover plate in predetermined spaced relation above said area, said area for supporting the specimen comprising a light polarizing layer of uniform light transmitting properties and division lines forming non-polarizing spaces crossing said area and subdividing said area into smaller units or counting zones, whereby when said area is being observed through said microscope and the division lines are illuminated so as to be distinctly visible and distinguishable from said counting zones, the illumination of said zones may be varied in intensity to suit the specimen or object under observation by changing the relative angularity between said light polarizing member and said layer without materially altering the illumination of said lines.

5. An optical counting chamber for use with a microscope or the like having a light polarizing member in optical alignment with the light path thereof and pivotally adjustable relative thereto, said chamber comprising a transparent body portion, said body portion having an area for supporting the specimen under test or examination and spaced upstanding cover supporting ribs adjacent thereto and arranged to support a flat transparent cover in predetermined spaced relation above said area, said area for supporting the specimen comprising a light polarizing layer of uniform light transmitting properties and a layer of transparent protective material positioned thereon, division lines forming non-polarizing spaces crossing said area and subdividing said area into smaller units or counting zones, whereby when said area is being observed through said microscope and the division lines are illuminated so as to be distinctly visible and distinguishable from said zones, the illumination of said zones may be varied in light intensity to suit the specimen or object under observation by changing the relative angularity between said light polarizing member and said layers without materially altering the illumination of said lines.

6. In a microscope the combination of an optical counting chamber adapted to support a specimen or the like thereon and allow same to be examined or counted against a background of desired light intensity, said chamber comprising a transparent body portion having a light polarizing area carried thereby and division lines crossing said area and subdividing said areas into unit polarizing areas separated by non-polarizing spaces therebetween, each unit polarizing area being of such a character as to allow the uniform transmission of light therethrough, light polarizing means carried by said microscope in optical alignment with said area, and means for adjusting the relative angular relationship between said polarizing area and said polarizing means, whereby when said unit areas are under magnification with said lines illuminated so as to be distinctly visible and distinguishable from said unit polarizing areas said unit areas may be varied in light intensity by varying said angular relationship to obtain a background of desired intensity without altering the illumination of said lines.

ALVA H. BENNETT.

REFERENCES CITED

The following references are of record in the file of this patent:

UNITED STATES PATENTS

| Number | Name | Date |
|---|---|---|
| 2,235,310 | Bausch | Mar. 18, 1941 |
| 2,316,643 | Yule | Apr. 13, 1943 |
| 2,316,644 | Yule | Apr. 13, 1943 |
| 2,328,585 | Rooney | Sept. 7, 1943 |
| 2,329,543 | Land | Sept. 14, 1943 |
| 2,281,101 | Land | Apr. 28, 1942 |
| 2,264,190 | Sherts et al. | Nov. 25, 1941 |
| 2,301,254 | Carnahan | Nov. 10, 1942 |
| 2,185,018 | Sauer | Dec. 26, 1939 |
| 2,105,671 | Roesch | Jan. 18, 1938 |
| 2,078,181 | Land | Apr. 20, 1937 |
| 1,836,915 | George | Dec. 15, 1931 |
| 1,994,483 | Ott | Mar. 19, 1935 |
| 2,300,252 | Hall | Oct. 27, 1942 |

FOREIGN PATENTS

| Number | Country | Date |
|---|---|---|
| 702,024 | Germany | Jan. 29, 1941 |